United States Patent
Baghel

(10) Patent No.: US 10,021,620 B2
(45) Date of Patent: Jul. 10, 2018

(54) RELAY SIGNALING BETWEEN UE AND NETWORK

(71) Applicant: QUALCOMM Incorporated, San Diego, CA (US)

(72) Inventor: Sudhir Kumar Baghel, Bridgewater, NJ (US)

(73) Assignee: Qualcomm Incorporated, San Diego, CA (US)

( * ) Notice: Subject to any disclaimer, the term of this patent is extended or adjusted under 35 U.S.C. 154(b) by 95 days.

(21) Appl. No.: 15/006,769

(22) Filed: Jan. 26, 2016

(65) Prior Publication Data

US 2016/0234754 A1 Aug. 11, 2016

Related U.S. Application Data

(60) Provisional application No. 62/114,503, filed on Feb. 10, 2015.

(51) Int. Cl.
*H04B 7/14* (2006.01)
*H04W 40/22* (2009.01)
(Continued)

(52) U.S. Cl.
CPC ........ *H04W 40/22* (2013.01); *H04W 72/042* (2013.01); *H04W 72/048* (2013.01); *H04W 72/0413* (2013.01); *H04W 72/1284* (2013.01); *H04W 72/1289* (2013.01); *H04W 88/04* (2013.01); *H04W 72/085* (2013.01);
(Continued)

(58) Field of Classification Search
None
See application file for complete search history.

(56) References Cited

U.S. PATENT DOCUMENTS 9,853,709 B2 * 12/2017 Ryu .................. H04B 7/15507
2011/0194485 A1 * 8/2011 Horneman .......... H04W 72/042
370/315

(Continued)

OTHER PUBLICATIONS

3GPP TR 23.703: "3rd Generation Partnership Project, Technical Specification Group Services and System Aspects, Study on Architecture Enhancements to Support Proximity-Based Services (ProSe) (Release 12)", 3rd Generation Partnership Project (3GPP), Mobile Competence Centre, 650, Route Des Lucioles, F-06921 Sophia-Antipolis Cedex, France, vol. SA WG2. No. V12.0.0, Mar. 10, 2014 (Mar. 10, 2014), pp. 1-324, XP050769633, [retrieved on Mar. 10, 2014]* chapters 6.3.10. 6.3.12 ** chapters 4.1.3-4.3.1. 5.5. 6.2. 8.6, A.2. D *.

(Continued)

*Primary Examiner* — Phirin Sam
(74) *Attorney, Agent, or Firm* — Arent Fox, LLP and Qualcomm, Incorporated

(57) ABSTRACT

A method, an apparatus, and a computer-readable medium for wireless communication are provided. The apparatus may be a UE. The UE may transmit a message that includes a relay status of the UE. The relay status may indicate whether the UE intends to function as a relay node between a base station and at least one D2D destination. The UE may receive a DCI message based on the relay status of the UE. The DCI message may indicate resources allocated to the UE based on the relay status of the UE. The UE may transmit data on the resources allocated to the UE based on the relay status of the UE.

26 Claims, 11 Drawing Sheets

(51) Int. Cl.
*H04W 72/04* (2009.01)
*H04W 88/04* (2009.01)
*H04W 72/12* (2009.01)
*H04W 76/14* (2018.01)
*H04W 72/08* (2009.01)

(52) U.S. Cl.
CPC ...... *H04W 72/121* (2013.01); *H04W 72/1231* (2013.01); *H04W 76/14* (2018.02)

(56) References Cited

U.S. PATENT DOCUMENTS

| | | | | |
|---|---|---|---|---|
| 2015/0271846 | A1* | 9/2015 | Kowalski | H04W 72/14 370/329 |
| 2016/0072852 | A1* | 3/2016 | Keller | H04L 65/1016 370/352 |
| 2016/0088668 | A1* | 3/2016 | Kim | H04W 76/023 370/315 |
| 2016/0182145 | A1* | 6/2016 | Shi | H04B 7/2606 455/436 |
| 2016/0204847 | A1* | 7/2016 | Ryu | H04B 7/15507 455/7 |
| 2016/0353307 | A1* | 12/2016 | Jung | H04W 24/10 |
| 2017/0099688 | A1* | 4/2017 | Chae | H04W 76/023 |
| 2017/0171874 | A1* | 6/2017 | Kim | H04W 72/12 |
| 2018/0076878 | A1* | 3/2018 | Ryu | H04W 72/048 |

OTHER PUBLICATIONS

Ericsson: "Introduction of ProSe", 3GPP Draft, 36321_CR0744R3_(Rel-12) R2-150348 Introduction of Prose, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 10, 2015-Feb. 14, 2015 Feb. 8, 2015 (Feb. 8, 2015), XP050935324, Retrieved from the Internet: URL:http://www.3gpp.org/ftp/Meetings_3GPP_SYNC/RAN3/Docs/ [retrieved on Feb. 8, 2015] * chapters 5.4.3.1, 5.4.4, 5.x.1.4, 6.1.3.X *.
Ericsson: "ProSe Rel-13 Enhancements in RAN3", 3GPP Draft R3-150333, 3rd Generation Partnership Project (3GPP), Mobile Competence Centre, 650, Route Des Lucioles, F-06921 Sophia-Antipolis Cedex, France, vol. RAN WG3, No. Athens, Greece, Feb. 9, 2015-Feb. 13, 2015 Feb. 8, 2015 (Feb. 8, 2015), XP050937084, Retrieved from the Internet: URL:http://www.3gpp.org/ftp/Meetings_3GPP_SYNC/RAN3/Docs/ [retrieved on Feb. 8, 2015] * chapter 2.1 *.
International Search Report and Written Opinion—PCT/US2016/015822—ISA/EPO—dated Apr. 26, 2016.
Nokia Networks et al: "Transmission of ProseUE Information Message", 3GPP Draft, R2-150512 ProseUE Information V001, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 9, 2015-Feb. 13, 2015 Feb. 8, 2015 (Feb. 8, 2015), XP050935758, Retrieved from the Internet: URL:http://www.3gpp.org/ftp/Meetings_3GPP_SYNC/RAN3/Docs/ [retrieved on Feb. 8, 2015] * chapter 2 *.
Samsung: "Introduction of ProSe", 3GPP Draft, 36331_CR1688R1_(Rel-12) R2-150443_Introducing Prose, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 9, 2015-Feb. 13, 2015 Feb. 8, 2015 (Feb. 8, 2015), XP050935333, Retrieved from the Internet: URL:http://www.3gpp.org/ftp/Meetings_3GPP_SYNC/RAN3/Docs/ [retrieved on Feb. 8, 2015] pp. 37-38 * chapters 5.3.5.3, 5.3.5.4, 5.3.10.X, 5.X.2, 6.3.8 *.

* cited by examiner

RELAY SIGNALING BETWEEN UE AND NETWORK

CROSS-REFERENCE TO RELATED APPLICATION(S)

This application claims the benefit of U.S. Provisional Application Ser. No. 62/114,503, entitled "RELAY SIGNALING BETWEEN UE AND NETWORK" and filed on Feb. 10, 2015, which is expressly incorporated by reference herein in its entirety.

BACKGROUND

Field

The present disclosure relates generally to communication systems, and more particularly, to relay signaling between a user equipment and a network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus are provided. The apparatus may be a user equipment (UE). The apparatus may transmit a message that may include a relay status of the apparatus. The relay status may indicate whether the apparatus intends to function as a relay node between a base station and at least one device-to-device (D2D) destination. The apparatus may receive a downlink control information (DCI) message based on the relay status of the apparatus. The DCI message may indicate resources allocated to the apparatus based on the relay status of the apparatus. The apparatus may transmit data on the resources allocated to the apparatus based on the relay status of the apparatus.

DETAILED DESCRIPTION

Figure 1:
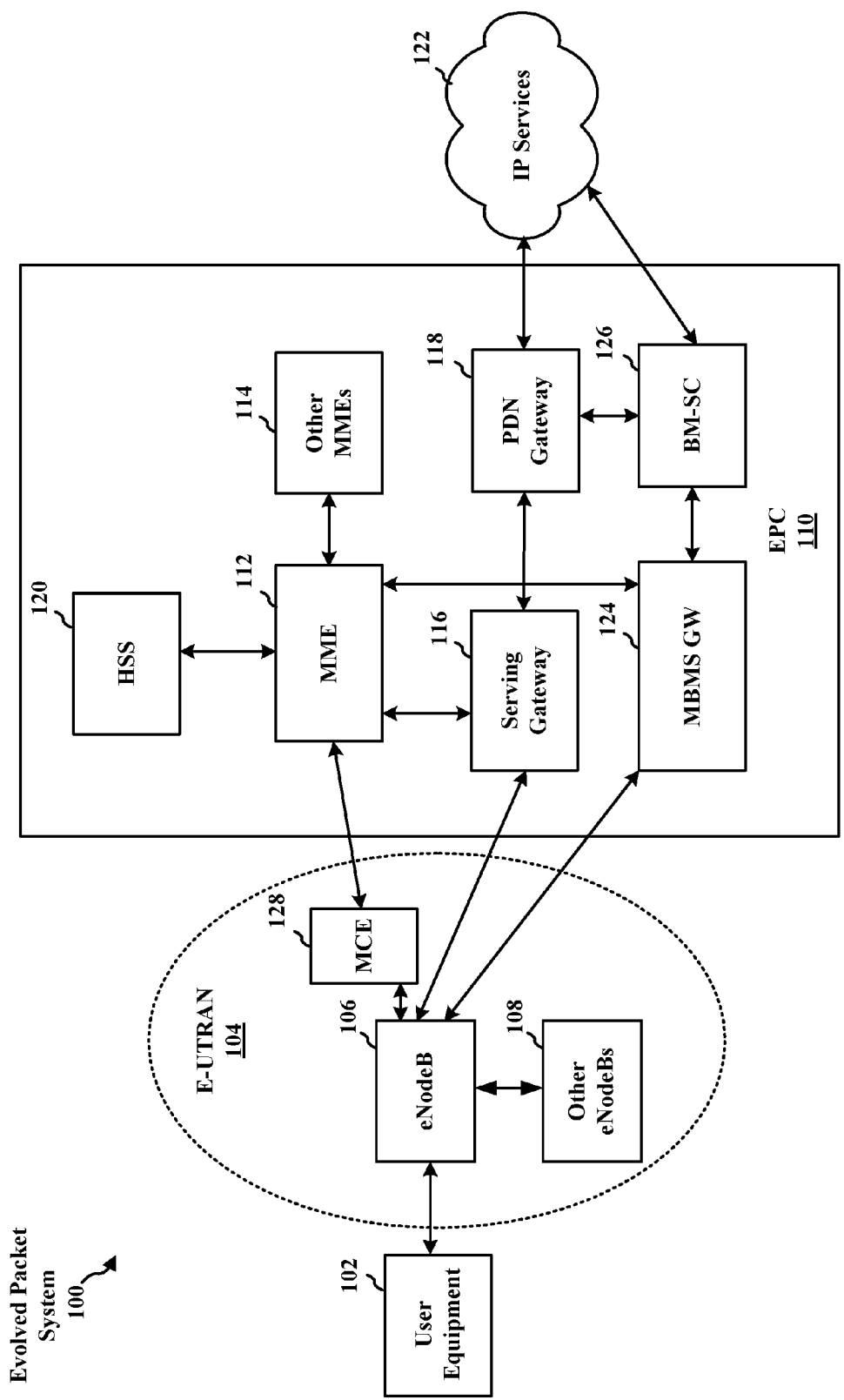
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more UE 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMES 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
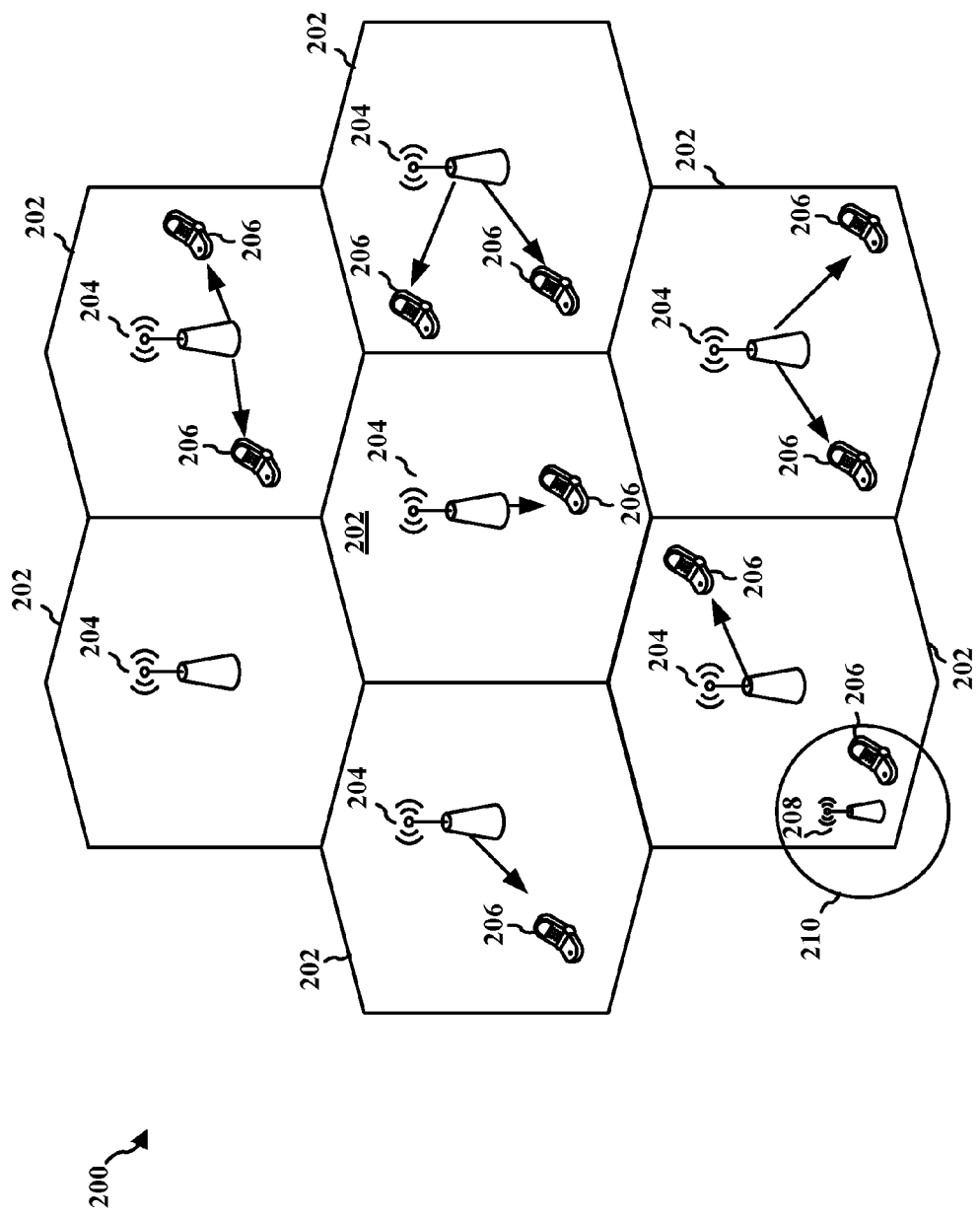
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2

(3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
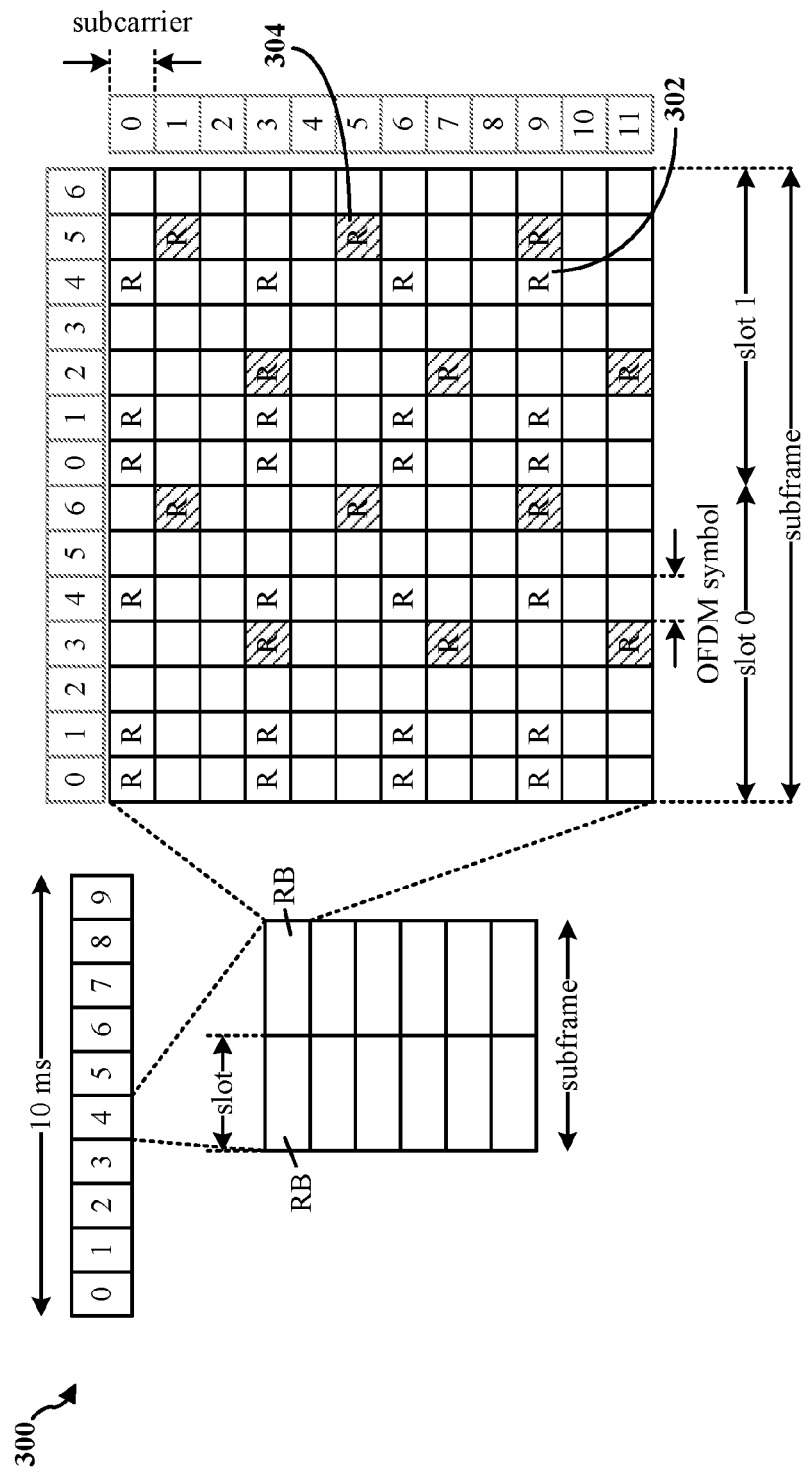
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
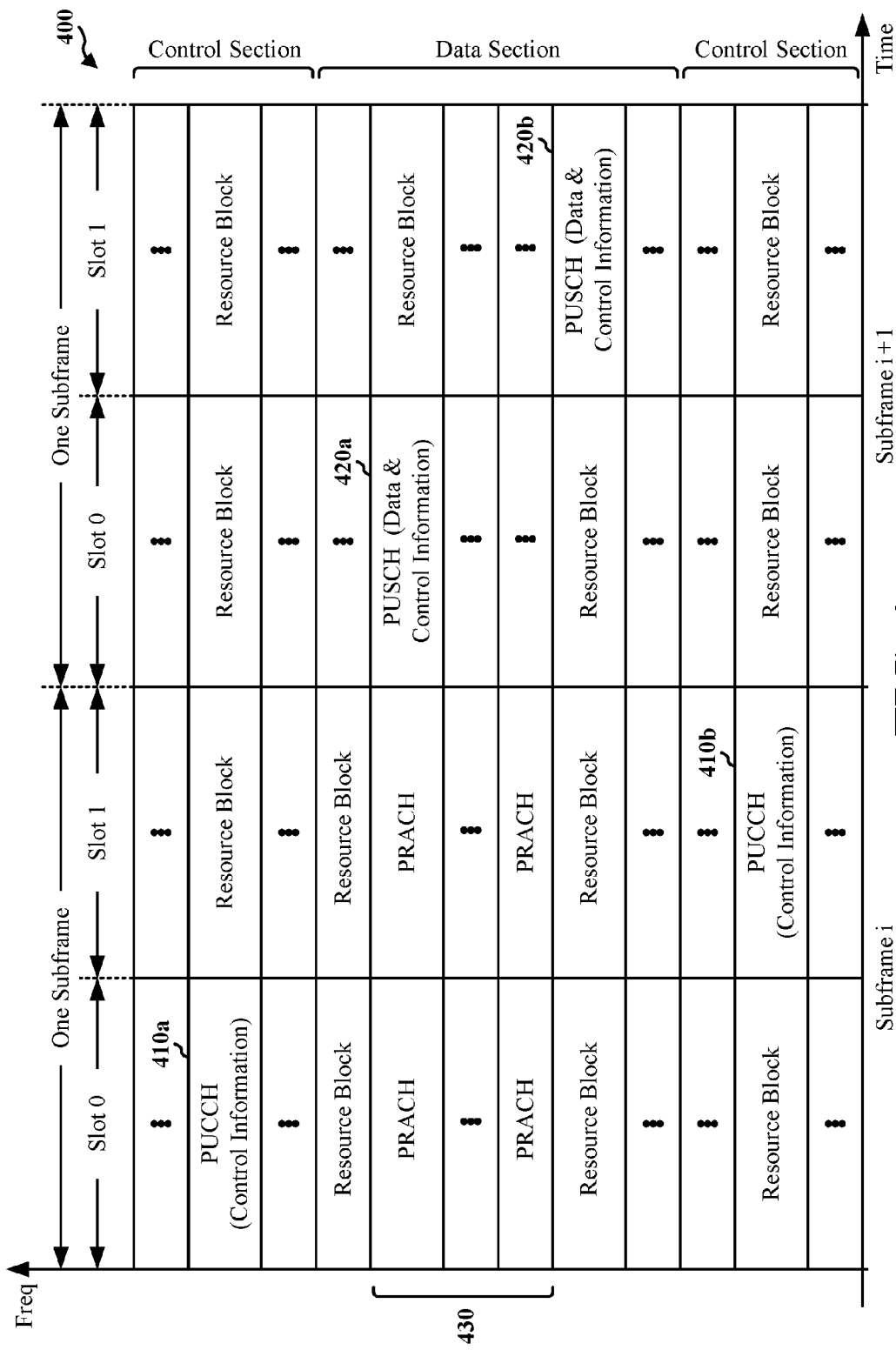
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
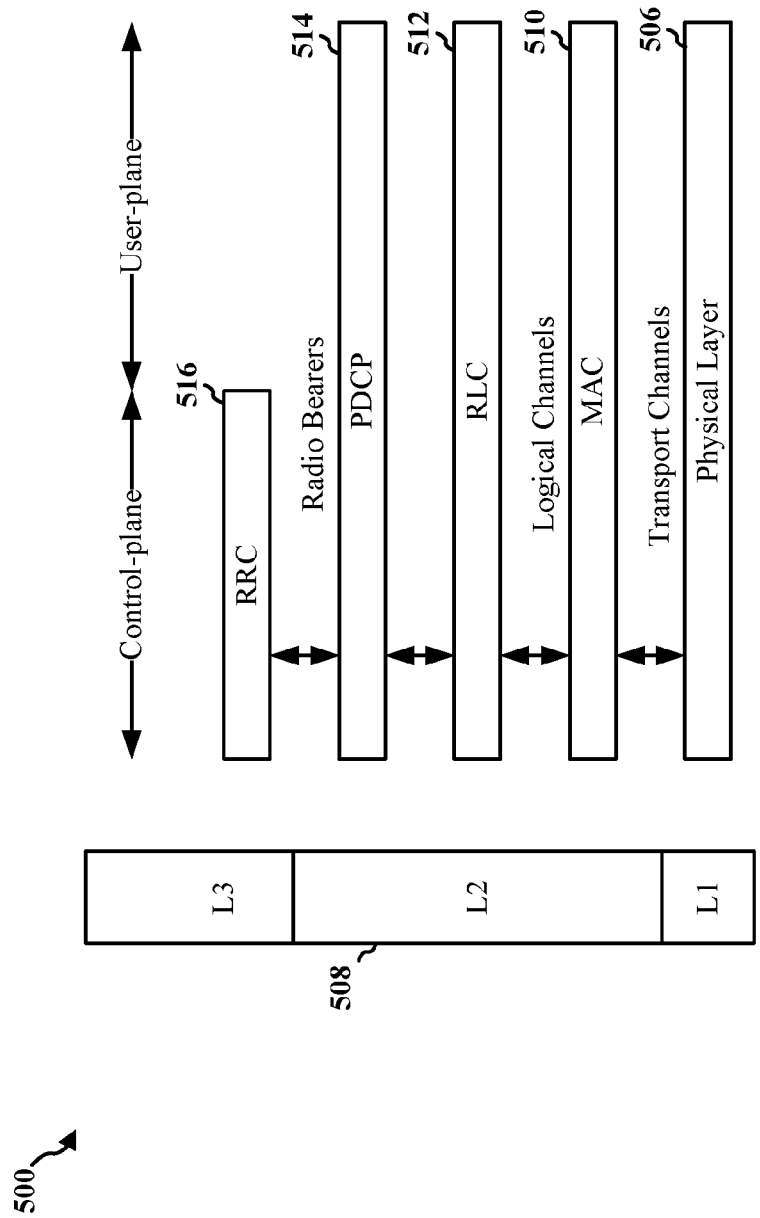
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
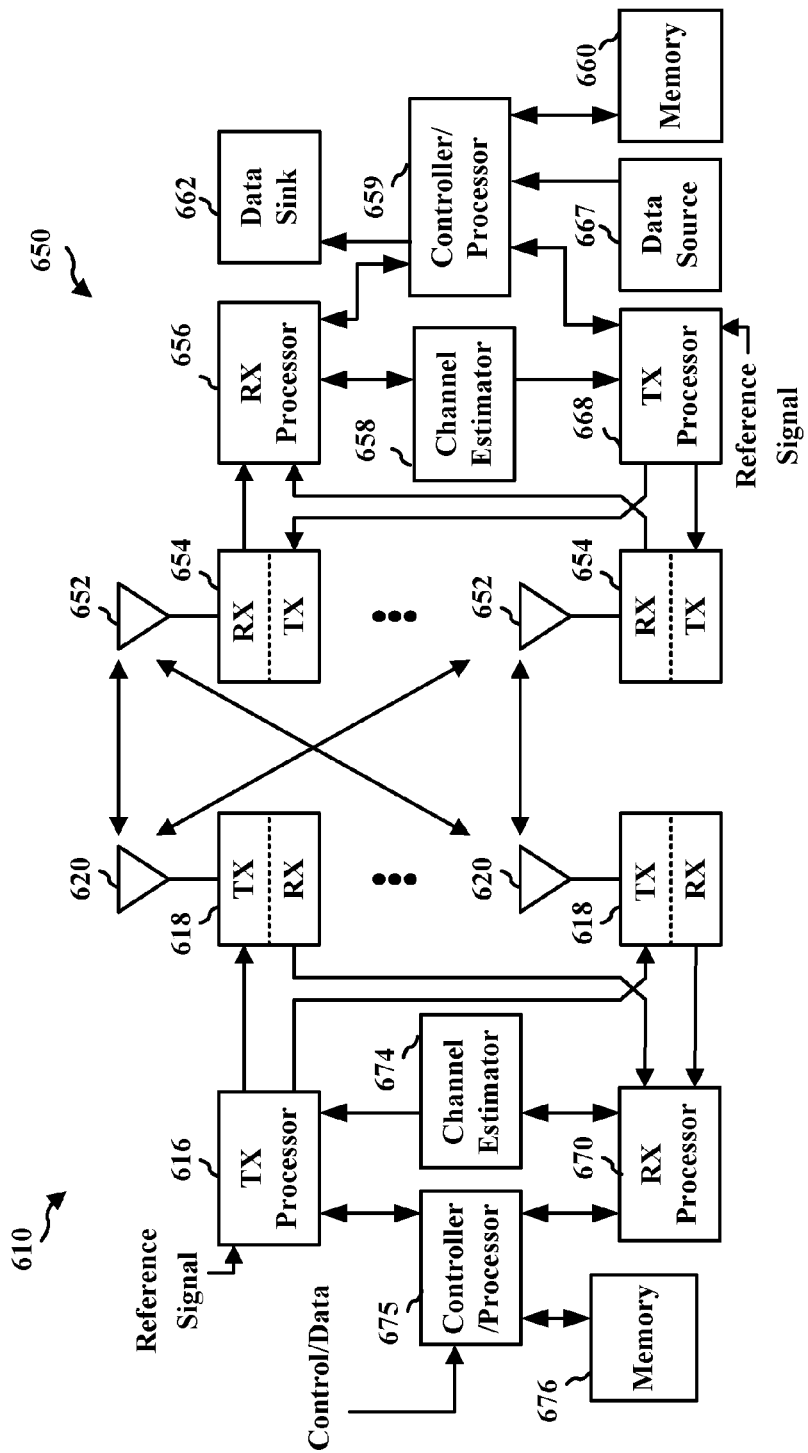
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
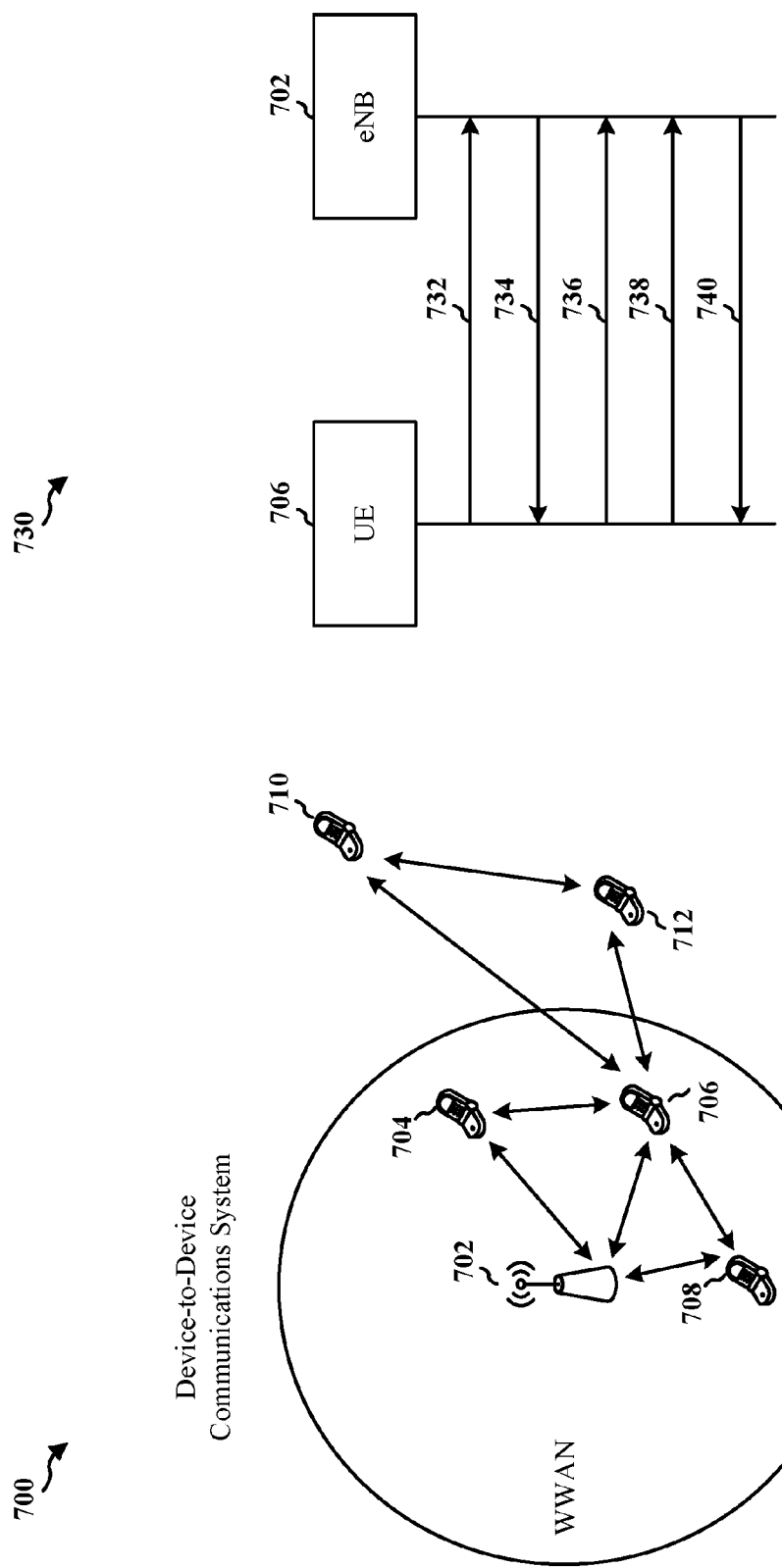
FIGS. 7A and 7B are diagrams of a device-to-device communications system performing device-to-device communication.

FIGS. 7A and 7B are diagrams of a device-to-device communications system 700 performing device-to-device communication. Referring to FIG. 7A, the device-to-device communications system 700 includes a base station 702 and a plurality of wireless devices 704, 706, 708, 710, 712. The device-to-device communications system 700 may overlap with a cellular communications system, such as for example, a wireless wide area network (WWAN). Some of the wireless devices 704, 706, 708, 710, 712 may communicate together in device-to-device communication using the DL/UL WWAN spectrum, some may communicate with a base station 702, and some may do both. For example, as shown in FIG. 7A, the wireless devices 706, 710, 712 are in device-to-device communication and the wireless devices 704, 706, 708 are in device-to-device communication. The wireless devices 710, 712 may be outside of the coverage of the base station 702, and therefore, the wireless devices 710, 712 may not communicate with the base station 702. The wireless devices 704, 706, 708 may be within the coverage of the base station 702 (or network) and therefore may communicate with the base station 702.

The exemplary methods and apparatuses discussed below are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

FIG. 7B illustrates a call flow diagram 730 in which a wireless device may request resources for D2D communication. Referring to the call flow diagram 730, when the wireless device 706 wants to initiate D2D communications with the wireless device 704, for example, the wireless device 706 may transmit a ProSeUEInformation message 732 to the base station 702 (e.g., ProSe may refer to Proximity Services, which is associated with D2D communication). The ProSeUEInformation message 732 may indicate that the wireless device 706 wants to initiate D2D communications and may include a request for resources. The ProSeUEInformation message 732 may also include one or more identifiers (IDs) associated with another wireless device or a group of wireless devices with which the wireless device 706 intends to perform D2D communication. The ProSeUEInformation message 732 may include a carrier frequency in which the wireless device 706 wants to perform the D2D communication (for purposes of enabling multi carrier operation). In an aspect, the ProSeUEInformation message 732 may be an RRC message. In response to receiving the ProSeUEInformation message 732, the base station 702 may transmit an RRCConnectionReconfiguration message 734 to the wireless device 706. The RRCConnectionReconfiguration message 734 may indicate a pool or group of wireless resources that may be allocated to the wireless device 706 for D2D communication. The RRCConnectionReconfiguration message 734 may include Mode 1/Mode 2 information (e.g., time-frequency information of a wireless resource pool). The RRCConnectionReconfiguration message 734 may also include a D2D radio network temporary identifier (e.g., a sidelink radio network temporary identifier (SL-RNTI)). Upon successfully receiving the RRCConnectionReconfiguration message 734, the wireless device 706 may transmit a RRCConnectionReconfigurationComplete message 736 to the base station 702 to indicate the successful reception. Subsequently, when the wireless device 706 has data to transmit to the wireless device 704, the wireless device 706 may request resources by transmitting a ProSe BufferStatusReport (BSR) message 738 to the base station 702. After receiving the ProSe BSR message 738, the base station 702 may transmit a DCI message 740 to the wireless device 706. The DCI message 740 may indicate wireless resources allocated to the wireless device 706 based on the ProSe BSR message 738. The wireless device 706 may identify/determine which DCI message is intended for the wireless device 706 based on the SL-RNTI received in the RRCConnectionReconfiguration message 734.

In some instances, wireless devices (e.g., the wireless device 706) may act or function as a relay between base stations and at least one D2D destination (e.g., another wireless device or group of wireless devices that do not have network access). D2D communications may be used in areas that are outside a network coverage (e.g., outside the coverage of a base station). Wireless devices performing D2D communication outside network coverage may have a need or be required to access the network. As such, a need exists to enable wireless devices engaging in D2D communication outside of a network to receive and transmit data to a base station. This may be accomplished if one of the wireless devices is in coverage (e.g., has access to the network) and may serve as a relay node between the base station and the group of wireless devices that are out of coverage. For example, referring to FIG. 7A, wireless devices 706, 710, 712 may be a first D2D group and wireless devices 704, 706, 708 may be a second D2D group. The wireless device 706 performs D2D communication with both the first and second D2D groups. The first D2D group may be out of coverage and may not be able to communicate with the base station 702. The second D2D group may be in coverage and be able to communicate with the base station 702. To enable the wireless devices 710, 712 to communicate with the base station 702, the wireless device 706 may act as the relay node between the first D2D group and the base station 702. To enable the wireless device 706 to serve as a relay node, the signaling between the wireless device 706 and the base station 702 (or the network) are discussed below.

Figure 8:
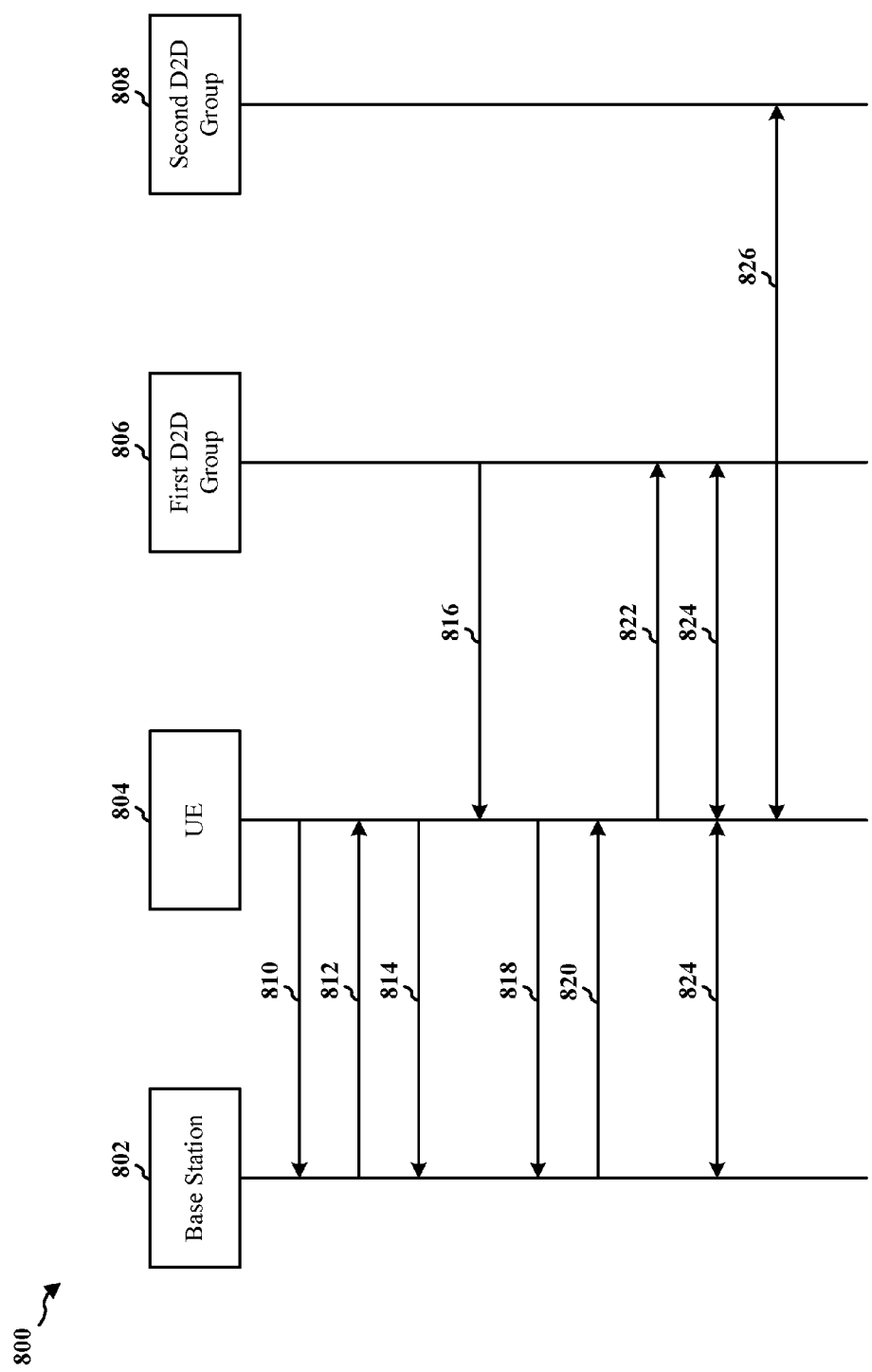
FIG. 8 is a call flow diagram illustrating an exemplary procedure for relay signaling between a UE and a network.

FIG. 8 is a call flow diagram 800 illustrating an exemplary procedure for relay signaling between a UE and a network. In FIG. 8, a UE 804 may be within coverage of a base station 802 (e.g., an eNB). The UE 804 may be communicating D2D with a first D2D group 806 and a second D2D group 808, and the first D2D groups 806 may be out of the coverage of the base station 802. The first D2D group 806 may have data to transmit to the base station 802. Although the first D2D group 806 is out of coverage of the base station 802, the UE 804 may serve as a relay node for communicating data between the first D2D group 806 and the base station 802.

To serve as the relay node, the UE 804 may transmit a first message 810 to the base station 802. In an aspect, the first message 810 may be an RRC message (e.g., the ProSeUEInformation message 732) or another type of direct communication indication message (e.g., a message transmitted over transmission control protocol (TCP)/IP). The first message 810 may indicate an intention to perform D2D communications and request D2D resources. The first message 810 may indicate a relay status of the UE 804. The relay status may indicate whether the UE 804 intends to function as a relay node between the base station 802 and at least one D2D group. The D2D group may include multiple UEs or just one UE. If the D2D group has only one UE, then the UE 804 may serve as a relay node between the base station 802 and the one UE in the D2D group. Otherwise, if the D2D group has multiple UEs, then the UE 804 may serve as a relay node between the base station 802 and the D2D group.

The first message 810 may include a list of D2D group IDs (e.g., a list of 5 D2D group IDs or D2D destination IDs), which indicates an intention of the UE 804 to engage in D2D communication with a D2D group associated with each of the D2D group IDs. From the list of D2D group IDs, a subset of the D2D group IDs may correspond to D2D groups with which the UE 804 intends to act as a relay node between the base station 802 and UE 804. For example, the first D2D group 806 and the second D2D group 808 may be in the list of D2D groups. If the UE 804 intends to act as a relay node for the first D2D group 806, the UE 804 may indicate that the UE 804 intends to function as a relay node for the first D2D group 806 but not for the second D2D group 808. If the first D2D group 806 has only one UE, then the UE 804 may indicate the UE ID instead of the D2D group ID. In other words, the first message 810 may indicate a subset of the D2D groups with which the UE 804 intends to act as a relay node. In other instances, the UE 804 may indicate that the UE 804 intends to act as a relay node for all of the D2D group IDs provided in the first message 810.

In another aspect, the first message 810 may include one or more bits associated with each D2D group ID. A first bit associated with each D2D group in the list of D2D group IDs may be used to indicate whether the UE 804 wants to perform D2D communication with the D2D groups. If the first bit is 1, then the UE 804 may want to perform D2D communication, but if the first bit is 0, then the UE 804 may not want to perform D2D communication. A second bit associated with each D2D group in the list of D2D group IDs may be used to indicate whether the UE 804 intends to function as a relay node for the D2D group associated with the D2D group ID. If the second bit is 1, then the UE 804 may want to act as a relay node for the particular D2D group, but if the second bit is 0, then the UE 804 may not want to act as the relay node for the particular D2D group. In another aspect, instead of using a separate bit indicator/tag for each D2D group ID, a common indicator or field may be used to indicate that all D2D group IDs are for relay communication or are not for relay communication.

The first message 810 may request D2D communication resources based on the relay status of the UE 804 (e.g., the UE 804 intends to function as a relay node). The first message 810 may request D2D communication resources based on other D2D groups with which the UE 804 intends to communicate but not act as a relay node. In an aspect, the first message 810 may include a carrier frequency in which the UE 804 intends to perform the D2D communication. Including the carrier frequency in the first message 810 enables multi-carrier operation among different UEs (e.g., different UEs may communicate simultaneously over different frequencies). The indicated carrier frequency may be for D2D communication only or the indicated carrier frequency may be for communication as a relay node.

The first message 810 may include a link quality associated with a connection between the UE 804 and each of the UEs for which the UE 804 intends to function as the relay. The link quality may be used by the base station 802 for purposes of resource allocation.

Upon receiving the first message 810 from the UE 804 that indicates the relay status of the UE 804, the base station 802 may determine to allocate resources to the UE 804 based on the relay status of the UE 804, a number of D2D groups with which the UE 804 intends to perform D2D communications, a number of D2D groups with which the UE 804 intends to act as a relay, and/or a link quality between the UE 804 and the UEs associated with the D2D groups with which the UE 804 intends to act as a relay. In an aspect, the base station 802 may consider the number of neighboring wireless devices within the vicinity of the UE 804 in determining which resources to allocate, if any, for D2D communication.

After determining the resources allocated for D2D communication and/or for relay node functionality, the base station 802 may indicate the allocated resources in a configuration message 812 transmitted to the UE 804. In an aspect, the allocated resources may be dedicated to the UE 804 for D2D communication and/or for relay node functionality. In another aspect, the configuration message 812 may be a dedicated message (e.g., the RRCConnectionReconfiguration message 734 dedicated for the UE 804). The configuration message 812 may also indicate a pool of wireless resources (e.g., time-frequency information) that may be allocated to the UE 804 for D2D communication. The configuration message 812 may also include a radio network temporary identifier (e.g., an SL-RNTI).

Upon successfully receiving the configuration message 812, the UE 804 may transmit a configuration complete message 814 to the base station 802 indicating that the UE 804 successfully received the configuration message 812. In an aspect, the configuration complete message 814 may be the RRCConnectionReconfigurationComplete message 736.

Referring to FIG. 8, when the first D2D group 806 needs to communicate with the network, the first D2D group 806 may transmit a relay request message 816 to the UE 804. The relay request message 816 may indicate that the first D2D group 806 has data to transmit to the network and/or the first D2D group 806 has data to receive from the network. Upon receiving the relay request message 816, the UE 804 may determine whether to act as a relay node for the first D2D group 806. The determination may be based on traffic load, such as whether the UE 804 is acting as a relay node for any other D2D groups. If the traffic load is high, the UE 804 may determine not to serve as the relay node. The determination may also be based on a link quality of a connection between the UE 804 and the base station 802. If the link quality is poor, the UE 804 may determine not the act as a relay node. Although FIG. 8 shows that the relay request message 816 is transmitted after the first message 810, the relay request message 816 may be transmitted before the first message 810. In that instance, the relay status of the UE 804 indicated in the first message 810 may be based on the relay request message 816.

Subsequently, the UE 804 may transmit a second message 818 to the base station 802. The second message 818 may be, for example, a buffer status report (e.g., the ProSe BSR message 738 or another MAC control element). The second message 818 may indicate the relay status of the UE 804 (e.g., whether the UE 804 intends to serve as a relay node for one or more D2D groups/UEs). The second message 818 may be transmitted based on the relay request message 816 (e.g., the first D2D group 806 has data to transmit to the network and the UE 804 determines to act as the relay node) and/or based on when the UE 804 wants to communicate with the second D2D group 808. The second message 818 may include one or more D2D group indices, which may be associated with one or more D2D group IDs/D2D groups with which the UE 804 intends to communicate either for D2D communications or for D2D communication as a relay. A D2D group index may be associated with a D2D group ID transmitted in the first message 810 (e.g., the ProSeUEInformation message 732 or another direct communication indication message). The value of the D2D group index may correspond to a position of the D2D group identifier sent by the UE 804 in the first message 810. For example, if the first message 810 included a first D2D group ID 10 (associated with the first D2D group 806) followed by a second D2D group ID 50 (associated with the second D2D group 808), the corresponding D2D group indices may be 1 and 2, respectively. D2D group index 1 may refer to D2D group ID 10 because D2D group ID 10 was the first D2D group ID listed in the first message 810. Similarly, D2D group index 2 may refer to D2D group ID 50 because D2D group ID 50 was the second D2D group ID listed in the first message 810. In other words, the D2D group index may be associated with a D2D group ID of a D2D group for which the UE 804 intends to function as the relay node. In an aspect, a field may be included in the second message 818 to indicate whether all the D2D group indices are for relay communication. Alternatively, instead of using a common indicator, a tag/indicator (e.g., a bit indicator) may be associated with each D2D group index to indicate whether the UE 804 intends to act as a relay node for the D2D group associated with the D2D group index. Although 2 D2D group IDs and indices are discussed here, any number of group IDs and D2D group indices may be used. In an aspect, in the second message 818, the UE 804 may include a set of D2D group indices that represent a subset of the D2D groups indicated in the first message 810.

Upon receiving the second message 818, the base station 802 may determine whether to allocate D2D communication and/or relay node communication resources to the UE 804 based on the relay status of the UE 804. The allocated D2D and/or relay node communication resources may be indicated in a DCI message 820 (e.g., a DCI-5 message). The DCI message 820 may indicate which resources are allocated for D2D communication and which resources are allocated for relay node communication. The base station 802 may transmit the DCI message 820 to the UE 804. The DCI message 820 may include a cyclic redundancy check (CRC) attachment that is encoded (or scrambled) with a radio network temporary identifier (e.g., SL-RNTI) associated with the UE 804.

In an aspect, the base station 802 may be transmitting DCI messages to other UEs. The UE 804 may determine that the DCI message 820 is intended for the UE 804 based on a RNTI (e.g., SL-RNTI) that is used to encode or scramble the CRC attachment included in the DCI message 820. Upon receiving the DCI message 820, the UE 804 may determine whether the DCI message 820 is intended for the UE 804 by descrambling/decoding the CRC attachment of the DCI message 820 using the RNTI included in the configuration message 812 and performing a CRC. The error checking may be performed by determining whether the CRC transmitted with the DCI message 820 matches a CRC generated by the UE 804 based on the DCI message 820. If both the CRCs match, then no error is found, and the UE 804 may determine that the DCI message 820 is intended for the UE 804. Upon successfully receiving the DCI message 820 based on the relay status of the UE 804, the UE 804 may decode the DCI message 820 to determine the D2D and/or relay communication resources allocated to the UE 804. The UE 804 may transmit a relay status confirmation message 822 to the first D2D group 806 indicating that the UE 804 may provide network access to the first D2D group 806 by serving as the relay node between the first D2D group 806 and the base station 802. Subsequently, the UE 804 may communicate data 824 between the base station 802 and the first D2D group 806. That is, the UE 804 may receive data 824 from the first D2D group 806 and relay the data 824 to the base station 802. Similarly, the UE 804 may receive data 824 from the base station 802 and relay the data 824 to the first D2D group 806. In an aspect, the UE 804 may communicate with the second D2D group 808 based on the allocated D2D resources.

In another configuration, if the UE 804 moves to a new area not served by the base station 802, the base station 802 may perform handover procedures with respect to a target base station serving the new area. The base station 802 may transmit information received from the UE 804 in the first message 810 and/or the second message 818. The information may include the relay status of the UE 804 and/or least one of a D2D group ID (or D2D group index) associated with one or more D2D groups with which the UE 804 intends to communicate (for D2D communications and/or for relay node communications).

Figure 9:
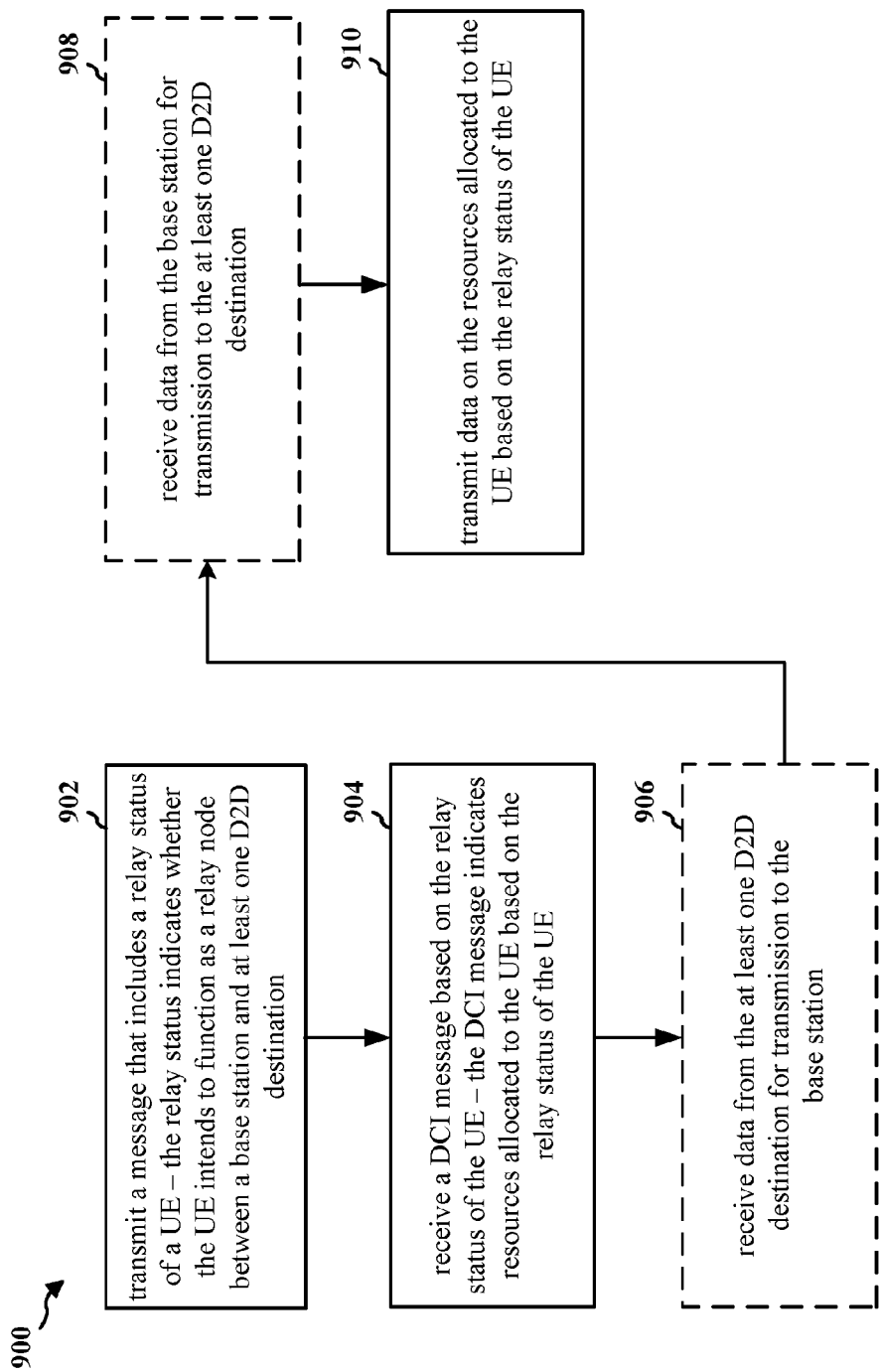
FIG. 9 is a flow chart of a method of wireless communication.

FIG. 9 is a flow chart 900 of a method of wireless communication. The method may be performed by a UE (e.g., the UE 804, the apparatus 1002/1002', infra). At 902, the UE may transmit a message that includes a relay status of the UE. The relay status may indicate whether the UE intends to function as a relay node between a base station and at least one D2D destination. In one example, referring to FIG. 8, the UE may correspond to the UE 804 and the message may correspond to the first message 810. The UE 804 may transmit the first message 810 to the base station 802. The first message 810 may include the relay status of the UE 804, and the relay status may indicate that the UE 804 intends to act as a relay node. The first message 810 may include the D2D group IDs (or D2D destination IDs) for the first D2D group 806 and the second D2D group 808 to indicate that the UE 804 wants to communicate with the first and second D2D groups 806, 808. The first message 810 may indicate that the UE 804 intends to function as the relay node for the first D2D group 806. The first message 810 may include a link quality between the UE 804 and each of the UEs in the first D2D group 806. In another example, referring to FIG. 8, the message may correspond to the second message 818. The UE 804 may transmit the second message 818 to the base station 802. The second message 818 may include the relay status of the UE 804 indicating that the UE 804 intends to function as a relay node. The second message 818 may include D2D group index 1, corresponding to the first D2D group ID included in the first message 810 (e.g., the D2D group ID for the first D2D group 806). A bit may be associated with the D2D group index 1, and the bit may be set to 1 to indicate that the D2D group index 1 is associated with a D2D group for which the UE 804 intends to function as a relay node. As such, the second message 818 indicates that the UE 804 wants to act as a relay for the first D2D group 806. The second message 818 may also indicate that the first D2D group 806 has data to transmit to the network.

At 904, the UE may receive a DCI message based on the relay status of the UE. The DCI message may indicate resources allocated to the UE based on the relay status of the UE. For example, referring to FIG. 8, the UE 804 may receive the DCI message 820 (after transmitting the second message 818) based on the relay status of the UE 804. The DCI message 820 may include a D2D group ID, or D2D group index, associated with the first D2D group 806 to indicate that the UE 804 may act as a relay node for the first D2D group 806. The DCI message 820 may indicate resources allocated to the UE 804 for serving as a relay node based on the relay status of the UE 804. If the UE 804 is also performing D2D communications with the second D2D group 808, the DCI message 820 may include resources allocated for D2D communications between the UE 804 and the second D2D group 808.

At 906, the UE may receive data from the at least one D2D destination for transmission to the base station. For example, referring to FIG. 8, the UE 804 may receive data 824 from the first D2D group 806 for transmission to the base station 802.

At 908, the UE may receive data from the base station for transmission to the at least one D2D destination. For example, referring to FIG. 8, the UE 804 may receive data 824 from the base station 802 for transmission to the first D2D group 806.

At 910, the UE may transmit data on resources allocated to the UE based on the relay status of the UE. For example, referring to FIG. 8, the UE 804 may transmit data 824, received from the base station 802, to the first D2D group 806 on resources allocated to the UE 804 based the relay status of the UE 804 and based on the received DCI message 820. In another example, the UE 804 may transmit data 824, received from the first D2D group 806, to the base station 802 on resources allocated to the UE 804 based on the relay status of the UE 804 and based on the received DCI message 820.

Figure 10:
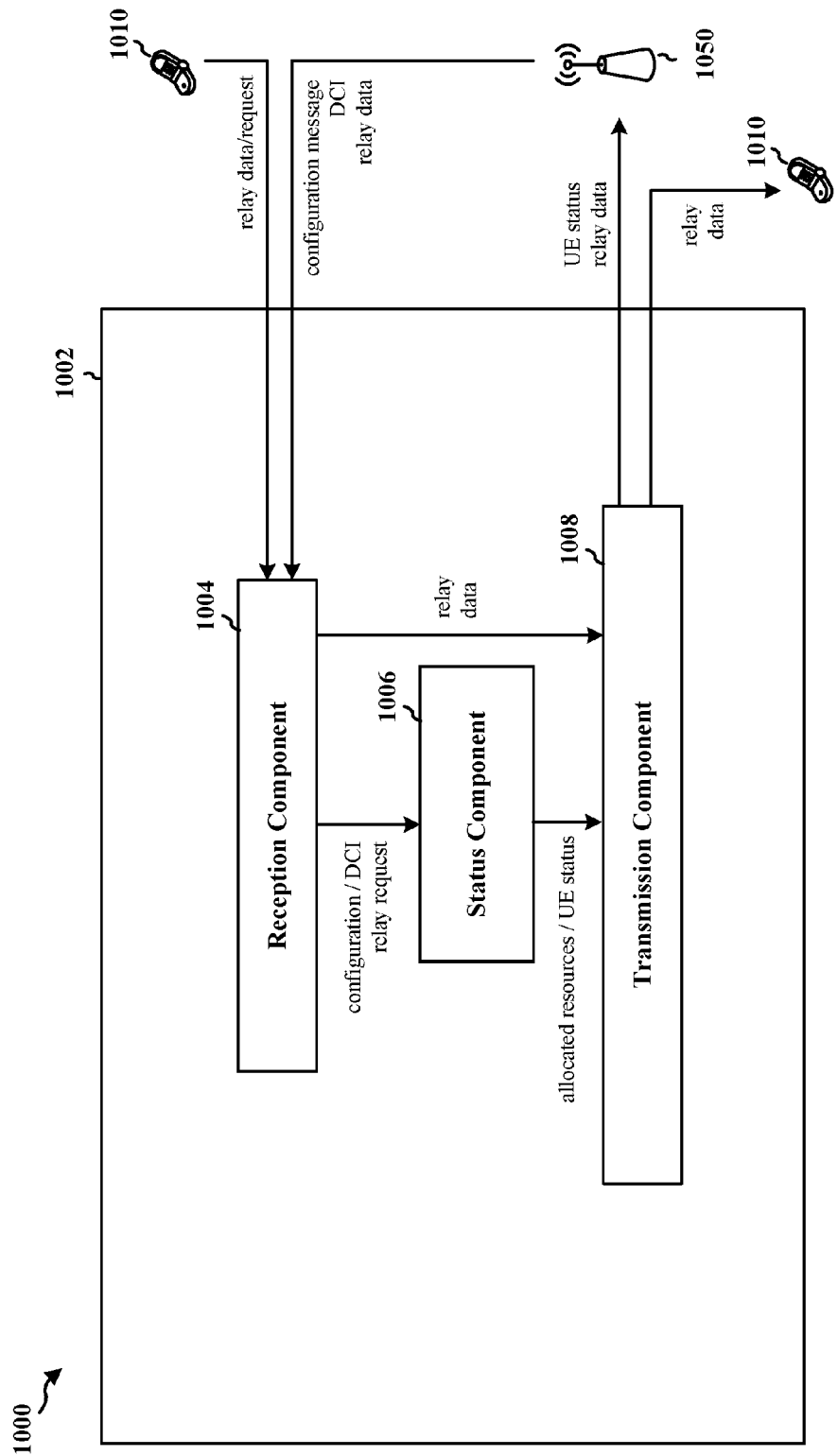
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus includes a reception component 1004, a status component 1006, and a transmission component 1008. The transmission component 1008 may be configured to transmit a message that includes a relay status of the apparatus. The relay status of the apparatus may be provided to the transmission component 1008 by the status component 1006. The relay status may indicate whether the apparatus intends to function as a relay node between a base station 1050 and at least one D2D group 1010. The reception component 1004 may be configured to receive a DCI message based on the relay status of the apparatus. The DCI message may indicate resources allocated to the apparatus based on the relay status of the apparatus. The transmission component 1008 may be configured to transmit data on the resources allocated to the apparatus based on the relay status of the apparatus. In an aspect, the message may indicate the at least one D2D group 1010 for which the apparatus intends to function as the relay node. In another aspect, the message may indicate a plurality of D2D groups with which the apparatus intends to communicate. The at least one D2D group 1010 for which the apparatus intends to function as the relay node may be a subset of the plurality of D2D groups. In another aspect, the message may indicate the at least one D2D group 1010 by including one or more of a D2D group ID or a UE ID. In another aspect, the message may include a link quality associated with a connection between the apparatus and one or more UEs in the at least one D2D group 1010 for which the apparatus functions as the relay node. In another aspect, the message may indicate an intention to perform D2D communication with the at least one D2D group 1010. In another aspect, the message may include a buffer status report and a D2D group index. The D2D group index may be associated with a D2D group identifier and correspond to a position of the D2D group identifier included in a direct communication indication message transmitted by the apparatus. The D2D group identifier may be associated with a D2D group for which the apparatus intends to function as the relay node. In one configuration, reception component 1004 may be configured to receive the data from the at least one D2D group 1010 for transmission to the base station 1050. In another configuration, the reception component 1004 may be configured to receive the data from the base station 1050 for transmission to the at least one D2D group 1010.

The apparatus may include additional components that perform each of the blocks of the algorithm in the aforementioned flow charts of FIG. 9. As such, each block in the aforementioned flow charts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
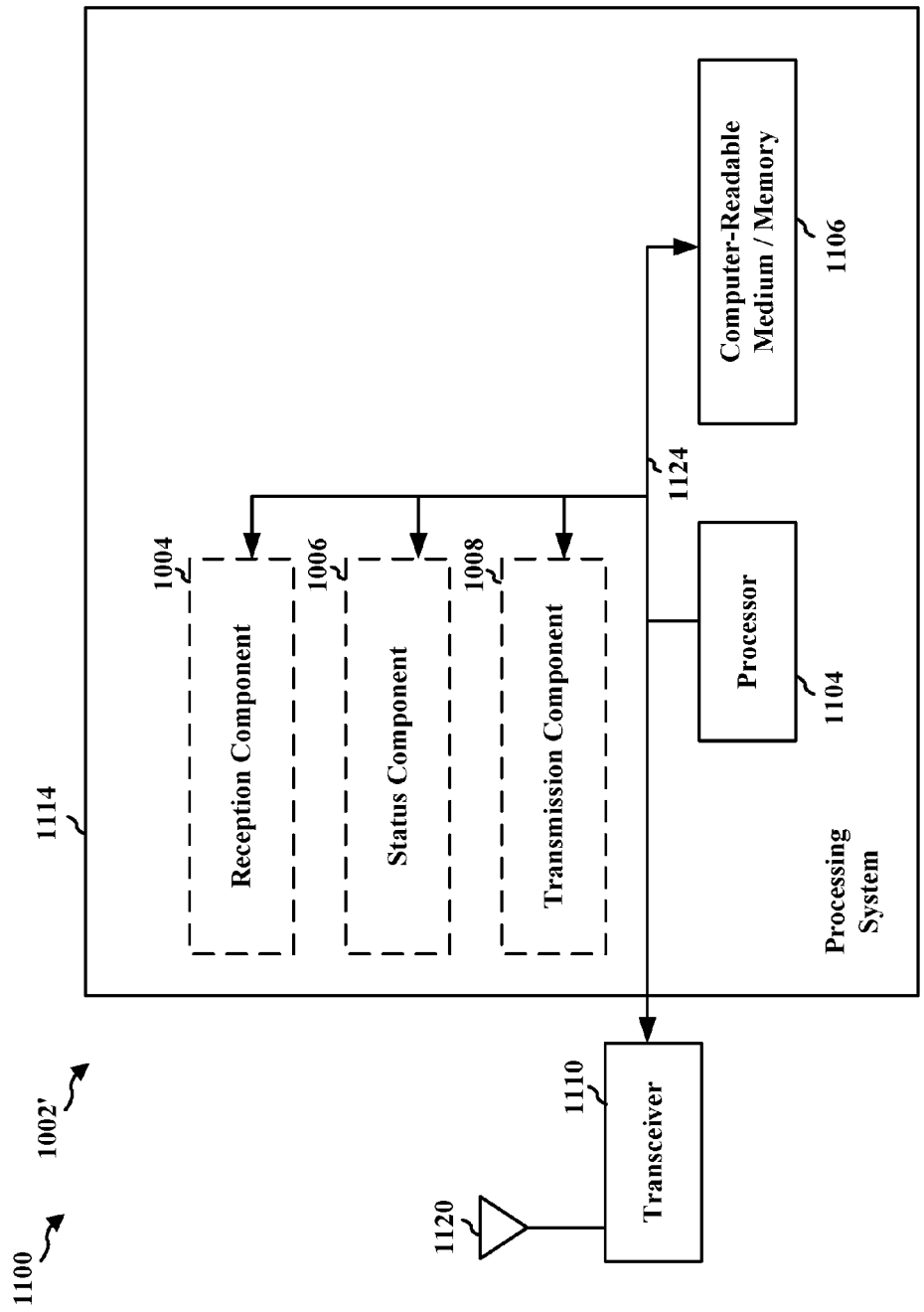
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1008, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the components 1104, 1106, 1108. The components may be software components running in the processor 1104, resident/stored in the computer readable medium/memory 1106, one or more hardware components coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 1002/1002' for wireless communication includes means for transmitting a message that includes a relay status of the apparatus. The relay status may indicate whether the apparatus intends to function as a relay node between a base station and at least one D2D group. The apparatus includes means for receiving a DCI message based on the relay status of the apparatus. The DCI message may indicate resources allocated to the apparatus based on the relay status of the apparatus. The apparatus includes means for transmitting data on the resources allocated to the apparatus based on the relay status of the apparatus. In an aspect, the message may indicate the at least one D2D group for which the apparatus intends to function as the relay node. In another aspect, the message may indicate a plurality of D2D groups with which the apparatus intends to communicate. The at least one D2D group for which the apparatus intends to function as the relay node may be a subset of the plurality of D2D groups. In another aspect, the message may indicate the at least one D2D group by including one or more of a D2D group ID or a UE ID. In another aspect, the message may include a link quality associated with a connection between the apparatus and one or more UEs in the at least one D2D group for which the apparatus functions as the relay node. In another aspect, the message may indicate an intention to perform D2D communication with the at least one D2D group. In another aspect, the message may include a buffer status report and a D2D group index. The D2D group index may be associated with a D2D group identifier and correspond to a position of the D2D group identifier included in a direct communication indication message transmitted by the apparatus. The D2D group identifier may be associated with a D2D group for which the apparatus intends to function as the relay node. In one configuration, the apparatus may include means for receiving the data from the at least one D2D group for transmission to the base station. In another configuration, the apparatus may include means for receiving the data from the base station for transmission to the at least one D2D group. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
    transmitting a message that comprises a relay status of the UE, the relay status indicating whether the UE intends to function as a relay node between a base station and at least one device-to-device (D2D) destination, wherein the message indicates the at least one D2D destination for which the UE intends to function as the relay node and a carrier frequency which the UE intends to use for communication as the relay node;
    receiving a downlink control information (DCI) message based on the relay status of the UE, the DCI message indicating resources allocated to the UE based on the relay status of the UE; and
    transmitting data on the resources allocated to the UE based on the relay status of the UE.

2. The method of claim 1, wherein the message indicates a plurality of D2D destinations with which the UE intends to communicate, and wherein the at least one D2D destination for which the UE intends to function as the relay node is a subset of the plurality of D2D destinations.

3. The method of claim 1, wherein the message indicates the at least one D2D destination by including one or more of a D2D group identifier (ID) or a UE ID.

4. The method of claim 1, wherein the message includes a link quality associated with a connection between the UE and one or more UEs in the at least one D2D destination for which the UE functions as the relay node.

5. The method of claim 1, wherein the message indicates an intention to perform D2D communication with the at least one D2D destination.

6. The method of claim 1, further comprising receiving the data from the at least one D2D destination for transmission to the base station.

7. The method of claim 1, further comprising receiving the data from the base station for transmission to the at least one D2D destination.

8. A method of wireless communication by a user equipment (UE), comprising:
- transmitting a message that comprises a relay status of the UE, the relay status indicating whether the UE intends to function as a relay node between a base station and at least one device-to-device (D2D) destination, the message indicating the at least one D2D destination for which the UE intends to function as the relay node, wherein the message includes a buffer status report and a D2D group index, wherein the D2D group index is associated with a D2D group identifier and corresponds to a position of the D2D group identifier included in a direct communication indication message transmitted by the UE, and wherein the D2D group identifier is associated with a D2D group for which the UE intends to function as the relay node;
- receiving a downlink control information (DCI) message based on the relay status of the UE, the DCI message indicating resources allocated to the UE based on the relay status of the UE; and
- transmitting data on the resources allocated to the UE based on the relay status of the UE.

9. An apparatus for wireless communication, comprising:
- means for transmitting a message that comprises a relay status of the apparatus, the relay status indicating whether the apparatus intends to function as a relay node between a base station and at least one device-to-device (D2D) destination, wherein the message indicates the at least one D2D destination for which the UE intends to function as the relay node and a carrier frequency which the UE intends to use for communication as the relay node;
- means for receiving a downlink control information (DCI) message based on the relay status of the apparatus, the DCI message indicating resources allocated to the apparatus based on the relay status of the apparatus; and
- means for transmitting data on the resources allocated to the apparatus based on the relay status of the apparatus.

10. The apparatus of claim 9, wherein the message indicates a plurality of D2D destinations with which the apparatus intends to communicate, and wherein the at least one D2D destination for which the apparatus intends to function as the relay node is a subset of the plurality of D2D destinations.

11. The apparatus of claim 9, wherein the message indicates the at least one D2D destination by including one or more of a D2D group identifier (ID) or a user equipment ID.

12. The apparatus of claim 9, wherein the message includes a link quality associated with a connection between the apparatus and one or more user equipments in the at least one D2D destination for which the apparatus functions as the relay node.

13. The apparatus of claim 9, wherein the message indicates an intention to perform D2D communication with the at least one D2D destination.

14. The apparatus of claim 9, further comprising means for receiving the data from the at least one D2D destination for transmission to the base station.

15. The apparatus of claim 9, further comprising means for receiving the data from the base station for transmission to the at least one D2D destination.

16. An apparatus for wireless communication, comprising:
- means for transmitting a message that comprises a relay status of the apparatus, the relay status indicating whether the apparatus intends to function as a relay node between a base station and at least one device-to-device (D2D) destination, the message indicating the at least one D2D destination for which the UE intends to function as the relay node, wherein the message includes a buffer status report and a D2D group index, wherein the D2D group index is associated with a D2D group identifier and corresponds to a position of the D2D group identifier included in a direct communication indication message transmitted by the apparatus, and wherein the D2D group identifier is associated with a D2D group for which the apparatus intends to function as the relay node;
- means for receiving a downlink control information (DCI) message based on the relay status of the apparatus, the DCI message indicating resources allocated to the apparatus based on the relay status of the apparatus; and
- means for transmitting data on the resources allocated to the apparatus based on the relay status of the apparatus.

17. An apparatus for wireless communication, comprising:
- a memory; and
- at least one processor coupled to the memory and configured to:
  - transmit a message that comprises a relay status of the apparatus, the relay status indicating whether the apparatus intends to function as a relay node between a base station and at least one device-to-device (D2D) destination, wherein the message indicates the at least one D2D destination for which the UE intends to function as the relay node and a carrier frequency which the UE intends to use for communication as the relay node;
  - receive a downlink control information (DCI) message based on the relay status of the apparatus, the DCI message indicating resources allocated to the apparatus based on the relay status of the apparatus; and
  - transmit data on the resources allocated to the apparatus based on the relay status of the apparatus.

18. The apparatus of claim 17, wherein the message indicates a plurality of D2D destinations with which the apparatus intends to communicate, and wherein the at least one D2D destination for which the apparatus intends to function as the relay node is a subset of the plurality of D2D destinations.

19. The apparatus of claim 17, wherein the message indicates the at least one D2D destination by including one or more of a D2D group identifier (ID) or a user equipment ID.

20. The apparatus of claim 17, wherein the message includes a link quality associated with a connection between the apparatus and one or more user equipments in the at least one D2D destination for which the apparatus functions as the relay node.

21. The apparatus of claim 17, wherein the message indicates an intention to perform D2D communication with the at least one D2D destination.

22. The apparatus of claim 17, wherein the at least one processor is further configured to receive the data from the at least one D2D destination for transmission to the base station.

23. The apparatus of claim 17, wherein the at least one processor is further configured to receive the data from the base station for transmission to the at least one D2D destination.

24. An apparatus for wireless communication, comprising:
a memory; and
at least one processor coupled to the memory and configured to:
transmit a message that comprises a relay status of the apparatus, the relay status indicating whether the apparatus intends to function as a relay node between a base station and at least one device-to-device (D2D) destination, the message indicating the at least one D2D destination for which the UE intends to function as the relay node, wherein the message includes a buffer status report and a D2D group index, wherein the D2D group index is associated with a D2D group identifier and corresponds to a position of the D2D group identifier included in a direct communication indication message transmitted by the apparatus, and wherein the D2D group identifier is associated with a D2D group for which the apparatus intends to function as the relay node;
receive a downlink control information (DCI) message based on the relay status of the apparatus, the DCI message indicating resources allocated to the apparatus based on the relay status of the apparatus; and
transmit data on the resources allocated to the apparatus based on the relay status of the apparatus.

25. A non-transitory computer-readable medium for a user equipment (UE) storing computer executable code, which when executed by a processor, causes the processor to:
transmit a message that comprises a relay status of the UE, the relay status indicating whether the UE intends to function as a relay node between a base station and at least one device-to-device (D2D) destination, wherein the message indicates the at least one D2D destination for which the UE intends to function as the relay node and a carrier frequency which the UE intends to use for communication as the relay node;
receive a downlink control information (DCI) message based on the relay status of the UE, the DCI message indicating resources allocated to the UE based on the relay status of the UE; and
transmit data on the resources allocated to the UE based on the relay status of the UE.

26. The non-transitory computer-readable medium of claim 25, further comprising code, which when executed by the processor, causes the processor to receive the data from the base station for transmission to the least one D2D destination.

* * * * *